(12) United States Patent
Ohzeki

(10) Patent No.: US 7,787,654 B2
(45) Date of Patent: Aug. 31, 2010

(54) ELECTRONIC WATERMARK EMBEDDING APPARATUS AND METHOD AND ELECTRONIC WATERMARK DETECTING APPARATUS AND METHOD

(75) Inventor: Kazuo Ohzeki, Tokyo (JP)

(73) Assignee: Shibaura Institute of Technology, Tokyo (JP)

( * ) Notice: Subject to any disclaimer, the term of this patent is extended or adjusted under 35 U.S.C. 154(b) by 0 days.

(21) Appl. No.: 12/665,308

(22) PCT Filed: Sep. 21, 2007

(86) PCT No.: PCT/JP2007/068355

§ 371 (c)(1),
(2), (4) Date: Mar. 17, 2010

(87) PCT Pub. No.: WO2009/037778

PCT Pub. Date: Mar. 26, 2009

(65) Prior Publication Data

US 2010/0183190 A1   Jul. 22, 2010

(51) Int. Cl.
*G06K 9/00* (2006.01)
(52) U.S. Cl. .................. 382/100; 382/296; 382/137; 382/232; 705/51; 705/57; 375/242
(58) Field of Classification Search ............ 382/100, 382/296, 298, 137, 232; 705/51, 57; 375/242
See application file for complete search history.

(56) References Cited

U.S. PATENT DOCUMENTS 7,489,797 B2 * 2/2009 Izquierdo .............. 382/100

7,587,063 B2 * 9/2009 Hwang et al. ............. 382/100
2004/0081318 A1 * 4/2004 Bilobrov et al. ........... 380/201

FOREIGN PATENT DOCUMENTS

JP     2005-223651     8/2005

(Continued)

OTHER PUBLICATIONS

Liu, Ruizhen et al., "An SVD-Based Watermarking Scheme for Protecting Rightful Ownership," IEEE Transactions on Multimedia, vol. 4, No. 1, pp. 121-128, Mar. 2002.

(Continued)

*Primary Examiner*—Wes Tucker
*Assistant Examiner*—Nancy Bitar

(57) ABSTRACT

An electronic watermark embedding apparatus includes means for storing a pixel matrix G with n rows and m columns of an input image, means for acquiring singular values $s_1$ to $s_r$, left singular vectors $u_1$ to $u_r$, and right singular vectors $v_1$ to $v_r$ of the pixel matrix G, means for creating a watermark information matrix W with r rows and r columns having a non-0 value as at least one nondiagonal element as electronic watermark information, creating a diagonal matrix S having singular values $s_1$ to $s_r$ as diagonal elements, and creating a matrix $S_w$ on the basis of $S_w = S + aW$ ($a \neq 0$). The apparatus also includes means for multiplying the matrix $S_w$ by a matrix U having the acquired left singular vectors $u_1$ to $u_r$ as columns from the left and multiplying the transposed matrix of a matrix V having the acquired right singular vectors $v_1$ to $v_r$ as columns from the right to create a pixel matrix $G_w$ with n rows and m columns, and outputting it as an electronic-watermark-embedded image of the input image.

8 Claims, 8 Drawing Sheets

(A)

(B)

FOREIGN PATENT DOCUMENTS

| | | |
|---|---|---|
| JP | 2006-505191 | 2/2006 |
| WO | WO 2004/040899 | 5/2004 |

OTHER PUBLICATIONS

Zhang, Xiao-Ping, "Comments on An SVD-Based Watermarking Scheme for Protecting Rightful Ownership," IEEE Transactions on Multimedia, vol. 7, No. 2, pp. 593-594, Apr. 2005.

Sugiyama, Masaharu et al., "A Cropping-Robust Watermarking Method Based on Singular Value Decomposition and Haar Transformation," Information and Communication Engineers D-II, 2002, vol. J85-D-II, No. 5, pp. 877-885 (Includes English abstract).

International Search Report for PCT/JP2007/068355, mailed Dec. 25, 2007.

* cited by examiner

FIG. 1
(A)
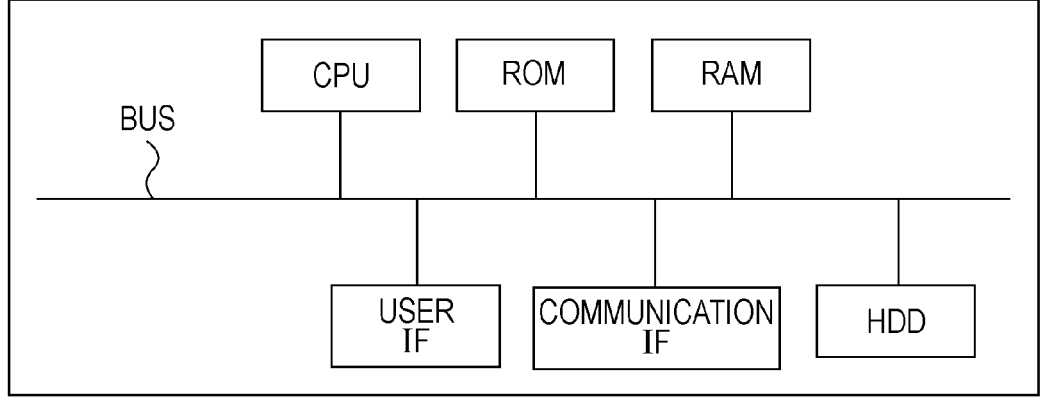
(B)
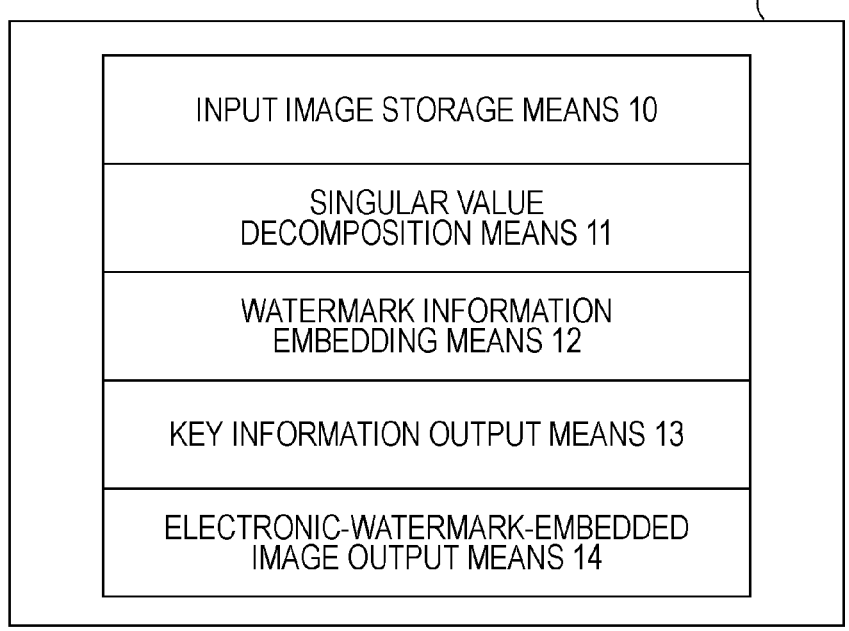

FIG. 3

(A) $\begin{bmatrix} 236 & 227 & 204 & 183 \\ 203 & 177 & 164 & 158 \\ 169 & 162 & 174 & 190 \\ 177 & 199 & 213 & 222 \end{bmatrix}$ (B) $\begin{bmatrix} S_1 & 0 & 0 & 0 \\ 0 & S_2 & 0 & 0 \\ 0 & 0 & S_3 & 0 \\ 0 & 0 & 0 & S_4 \end{bmatrix} = \begin{bmatrix} 767.6 & 0 & 0 & 0 \\ 0 & 63.2 & 0 & 0 \\ 0 & 0 & 17.9 & 0 \\ 0 & 0 & 0 & 0.25 \end{bmatrix}$ (C) $\begin{bmatrix} U_1 & U_2 & U_3 & U_4 \end{bmatrix} = \begin{bmatrix} -0.554 & -0.533 & 0.482 & -0.420 \\ -0.458 & -0.434 & -0.470 & 0.617 \\ -0.452 & 0.354 & -0.607 & -0.549 \\ -0.527 & 0.634 & 0.422 & 0.376 \end{bmatrix}$ (D) $\begin{bmatrix} V_1 & V_2 & V_3 & V_4 \end{bmatrix} = \begin{bmatrix} -0.513 & -0.664 & -0.533 & 0.111 \\ -0.502 & -0.228 & 0.661 & -0.509 \\ -0.494 & 0.263 & 0.308 & 0.769 \\ -0.491 & 0.662 & -0.429 & -0.370 \end{bmatrix}$

FIG. 4

(A)
$$\begin{Bmatrix} 0 & 0 & 0 & 0 \\ 0 & 0 & 0 & 0 \\ 0 & 0 & 0 & 0.25 \\ 0 & 0 & 17.9 & 0 \end{Bmatrix}$$

(B)
$$\begin{Bmatrix} 767.6 & 0 & 0 & 0 \\ 0 & 63.18 & 0 & 0 \\ 0 & 0 & 17.9 & 0.25 \\ 0 & 0 & 17.9 & 0.25 \end{Bmatrix}$$

(C)
$$\begin{Bmatrix} 240 & 222 & 202 & 186 \\ 197 & 184 & 167 & 153 \\ 174 & 156 & 171 & 194 \\ 173 & 203 & 215 & 219 \end{Bmatrix}$$

FIG. 5
(A)
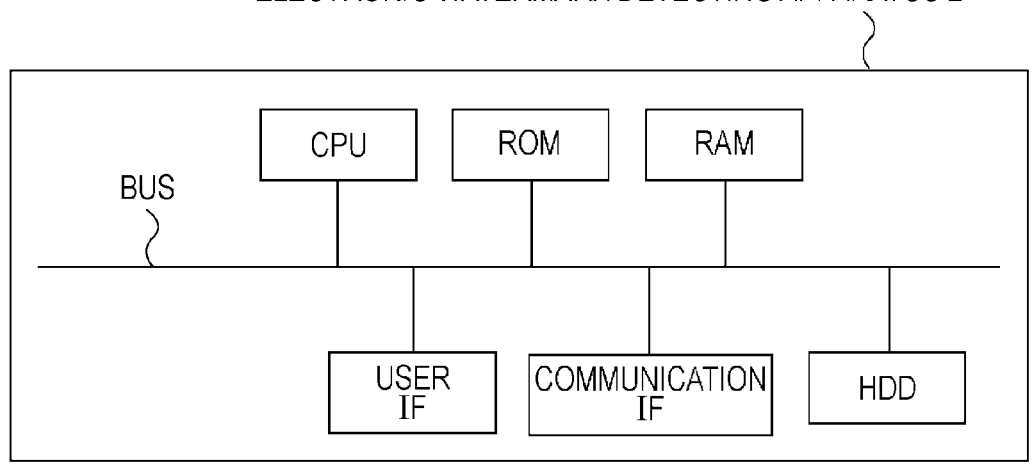
(B)
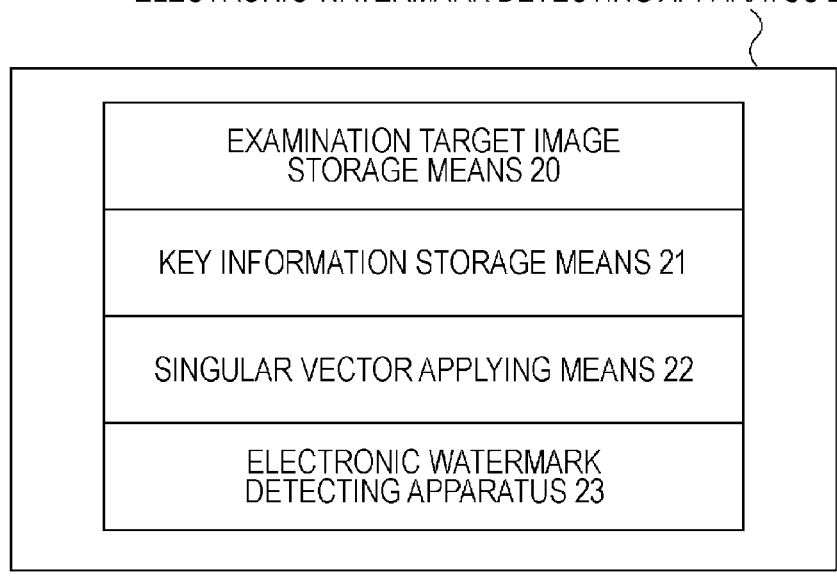

$$\begin{Bmatrix} 1 & 0 & 0 & 0 \\ \varepsilon & 1 & 0 & 0 \\ 0 & 0 & 1 & 0 \\ 0 & 0 & 0 & 1 \end{Bmatrix}$$

(B)

$$\begin{Bmatrix} 1 & 0 & 0 & 0 \\ -\varepsilon & 1 & 0 & 0 \\ 0 & 0 & 1 & 0 \\ 0 & 0 & 0 & 1 \end{Bmatrix}$$

(C)

$$S_W{}^* = \begin{Bmatrix} S_1 & 0 & 0 & 0 \\ 0 & S_2 & 0 & 0 \\ 0 & 0 & S_3 & 0 \\ 0 & 0 & 0 & S_4 \end{Bmatrix} + \begin{bmatrix} 1 & 0 & 0 & 0 \\ \varepsilon S_1 - \varepsilon S_2 & 1 & 0 & 0 \\ 0 & 0 & 1 & 0 \\ 0 & 0 & 0 & 1 \end{bmatrix}$$

ELECTRONIC WATERMARK EMBEDDING APPARATUS AND METHOD AND ELECTRONIC WATERMARK DETECTING APPARATUS AND METHOD

CROSS-REFERENCE TO RELATED APPLICATIONS

The present application is a U.S. national stage application claiming the benefit of International Application No. PCT/JP2007/068355, filed on Sep. 21, 2007, the entire contents of which is incorporated herein by reference in its entirety.

TECHNICAL FIELD

The present invention relates to a technology that embeds an electronic watermark to an image, for example, and a technology that detects an electronic watermark contained in an image, for example.

BACKGROUND ART

Hitherto, various electronic watermark schemes have been proposed and been developed. It is difficult to remove an electronic watermark from an image unless the key information for extracting it is available. Therefore, it is being widely used for the purpose of copyright protection, such as the prevention of tampering and illegal copy of images.

For example, Non-Patent Document 1 proposes an electronic watermark method using singular value decomposition (SVD).

More specifically, in order to embed an electronic watermark, singular value decomposition is performed on an original image A to acquire a singular value S and singular vectors U and V. Next, an electronic watermark W is embedded to the singular value S to create (S+αW). This further undergoes singular value decomposition to acquire a singular value $S_w$ and singular vectors $U_w$ and $V_w$. Then, the singular value $S_w$ is multiplied by the singular vectors U and $V^T$, which are acquired by the first singular value decomposition, from both sides to create an electronic-watermark-embedded image $A_w(=US_wV^T)$.

In order to detect an electronic watermark, singular value decomposition is performed on an examination target image $A_w^*$ to acquire the singular value $S_w^*$. Next, the singular value $S_w^*$ is calculated by the singular vectors $U_w^*$ and $V_w^{*T}$ from both sides to calculate $D^*(=U_w^*S_w^*V_w^{*T})$. Then, $W^*=(D^*-S)/\alpha$ acquired by performing expression transformation on $D^*=(S+\alpha W^*)$ is used to detect an electronic watermark $W^*$.

[Non-Patent Document 1] Ruizhen Liu et al, "An SVD-Based Watermarking Scheme for Protecting Rightful Ownership", IEEE Transactions on Multimedia, March in 2002, Vol. 4, No. 1, pp. 121-128

[Non-Patent Document 2] Xiao-Ping Zhang, "Comments on "An SVD-Based Watermarking Scheme for Protecting Rightful Ownership", IEEE Transactions on Multimedia, April in 2005, Vol. 7, No. 2, pp. 593-594

DISCLOSURE OF INVENTION

Problems to be Solved by the Invention

However, the scheme described in Non-Patent Document 1 does not clarify the mathematical meaning of the application of the singular vectors U and V by the first singular value decomposition to $S_w$ acquired by the second singular value decomposition, and, as a result, how the acquired watermark-embedded image $A_w$ relates to the original image A is not clear.

Regarding the scheme, the problem has been pointed out that an electronic watermark dependent on the singular vectors $U_w^*$ and $V_w^*$ to be used for the detection is detected regardless of both examination target image $A_w^*$ and actually embedded electronic watermark W (Non-Patent Document 2).

Accordingly, it is an object of the present invention to provide an inventive electronic watermark scheme that solves the problems.

Means for Solving the Problems

An electronic watermark embedding apparatus of the present invention includes input image storage means for storing a pixel matrix G with n rows and m columns ($2 \leq n$ and m) of an input image, singular value decomposition means for acquiring singular values $s_1$ to $s_r (s_1 > s_2 > \ldots > s_r)$, left singular vectors $u_1$ to $u_r$, and right singular vectors $v_1$ to $v_r$ of the pixel matrix G read from the input image storage means, means for creating a watermark information matrix W with r rows and r columns having a non-0 value at least one nondiagonal element as electronic watermark information, watermark information embedding means for creating a diagonal matrix S having singular values $s_1$ to $s_r$ as diagonal elements, and creating a matrix $S_w$ on the basis of $S_w=S+aW$ ($a \neq 0$), means for outputting the acquired singular values $s_1$ to $s_r$, left singular vectors $u_1$ to $u_r$, and right singular vectors $v_1$ to $v_r$ as electronic watermark key information, and means for multiplying the created matrix $S_w$ by a matrix U having the acquired left singular vectors $u_1$ to $u_r$ as columns from the left and multiplying the transposed matrix of a matrix V having the acquired right singular vectors $v_1$ to $v_r$ as columns from the right to create a pixel matrix $G_w$ with n rows and m columns, and outputting it as an electronic-watermark-embedded image of the input image.

Preferably, the electronic watermark embedding apparatus further includes original image storage means for storing an original image which is to be the target for embedding an electronic watermark, means for cutting out a partial image of n×m pixels from the original image means and storing a pixel matrix of the partial image in the input image storage means as the pixel matrix G with n rows and m columns of the input image, and means for replacing the partial image in the original image by the electronic-watermark-embedded image of the input image to create an electronic-watermark-embedded image of the original image and outputting it.

Preferably, the watermark information embedding means creates the watermark information matrix W such that the rank of the matrix $S_w$ can be lower than r.

An electronic watermark detecting apparatus of the invention includes examination target image storage mean for storing a pixel matrix $G_k$ with n rows and m columns of an examination target image, key information storage means for storing singular values $s_1$ to $s_r$, left singular vectors $u_1$ to $u_r$, and right singular vectors $v_1$ to $v_r$ of the pixel matrix G with n rows and m columns of an input image as electronic watermark key information, means for multiplying the pixel matrix $G_k$ read from the examination target image storage means by the transposed matrix of a matrix U having the left singular vectors $u_1$ to $u_r$ as columns from the left and a matrix V having the right singular vectors $v_1$ to $v_r$ as columns from the right to create matrix $S_k$ with r rows and r columns, and means for creating a diagonal matrix $S^*$ having the singular values $s_1$ to $s_r$ as diagonal elements, creating matrix $W^*$ with r rows and r columns on the basis of $W^*=(S_k-S^*)/a$, and outputting them as the detected electronic watermark.

An electronic watermark embedding method of the invention includes the step of reading a pixel matrix G from input image storage means storing the pixel matrix G with n rows and m columns ($2 \leq n$ and m) of an input image, a singular value decomposition step of acquiring the singular values $s_1$ to $s_r$ ($s_1 > s_2 > \ldots > s_r$), left singular vectors $u_1$ to $u_r$ and right singular vectors $v_1$ to $v_r$ of the read pixel matrix G, the step of creating a watermark information matrix W with r rows and r columns having a non-0 value as at least one nondiagonal element as electronic watermark information, the Watermark information embedding step of creating a diagonal matrix S having singular values $s_1$ to $s_r$ as diagonal elements and creating a matrix $S_w$ on the basis of $S_w=S+aW$ ($a \neq 0$), the step of outputting the acquired singular values $s_1$ to $s_r$, left singular vectors $u_1$ to $u_r$ and right singular vectors $v_1$ to $v_r$ as electronic watermark key information, the step of multiplying the created matrix $S_w$ by a matrix U having the acquired left singular vectors $u_1$ to $u_r$ as columns from the left and the transposed matrix of a matrix V having the acquired right singular vectors $v_1$ to $v_r$ as columns from the right to create a pixel matrix $G_w$ with n rows and m columns and outputting them as an electronic-watermark-embedded image of the input image.

An electronic watermark detecting method of the invention includes the steps of reading a pixel matrix $G_k$ from examination target image storage means for storing the pixel matrix $G_k$ with n rows and m columns of an examination target image, reading singular values $s_1$ to $s_r$, left singular vectors $u_1$ to $u_r$ and right singular vectors $v_1$ to $v_r$ from key information storage means storing singular values $s_1$ to $s_r$, left singular vectors $u_1$ to $u_r$ and right singular vectors $v_1$ to $v_r$ of pixel matrix $G_k$ with n rows and m columns of the input image as electronic watermark key information, multiplying the read pixel matrix $G_k$ by the transposed matrix of the matrix U having the read left singular vectors $u_1$ to $u_r$ as columns from the left and the matrix V having the read right singular vectors $v_1$ to $v_r$ as columns from the right to create a matrix $S_k$ with r rows and r columns, and creating a diagonal matrix $S^*$ having the read singular values $s_1$ to $s_r$ as diagonal elements, creating a matrix $W^*$ with r rows and r columns on the basis of $W^*=(S_k-S^*)/a$ and outputting it as the detected electronic watermark.

The electronic watermark embedding method and electronic watermark detecting method of the present invention may be executed by a CPU in a computer. The computer programs for the CPU may be installed or loaded to a computer through a medium such as a CD-ROM, a magnetic disk and a semiconductor memory or over a communication network, for example.

ADVANTAGES

As described above, according to the present invention, the number of times of singular value decomposition to be performed on an input image is equal to the number of times of the computing based on singular vectors to be performed for acquiring an electronic-watermark-embedded image. Therefore, there are no mathematically unclear points, unlike conventional schemes.

The singular vectors to be used for the embedding and detection are singular vectors of an input image and do not include information on an electronic watermark. This can prevent the problem that unintended information on an electronic watermark may mix thereinto due to computing using singular vectors.

BEST MODES FOR CARRYING OUT THE INVENTION

With reference to drawings, configurations and operations of embodiments of the present invention will be described below.

First Embodiment

FIG. 1 is a block diagram showing the configuration of an electronic watermark embedding apparatus according to a first embodiment of the present invention.

As shown in FIG. 1(A), an electronic watermark embedding apparatus 1 includes hardware equivalent to hardware of a normal computer apparatus, such as a CPU, a ROM, a RAM, an HDD, a user interface and a communication interface. The electronic watermark embedding apparatus 1 may physically be either specialized system or generic information processing apparatus. For example, in an information processing apparatus having a general configuration, the electronic watermark embedding apparatus 1 may be implemented by starting software defining processing in the electronic watermark embedding method according to the present invention.

As shown in FIG. 1(B), the electronic watermark embedding apparatus 1 functionally includes input image storage means 10 for storing a pixel matrix G with n rows and m columns ($2 \leq n$ and m) of an input image, singular value decomposition means 11 for acquiring singular values $s_1$ to $s_r$ ($s_1 > s_2 > \ldots > s_r$), left singular vectors $u_1$ to $u_r$ and right singular vectors $v_1$ to $v_r$ of the pixel matrix G read from the input image storage means 10, watermark information embedding means 12 for creating a watermark information matrix W with r rows and r columns having a non-0 value at least one nondiagonal element as electronic watermark information, creating a diagonal matrix S having singular values $s_1$ to $s_r$ as diagonal elements, and creating a matrix $S_w$ on the basis of $S_w=S+aW$ ($a \neq 0$), key information output means 13 for outputting the acquired singular values $s_1$ to $s_r$, left singular vectors $u_1$ to $u_r$ and right singular vectors $v_1$ to $v_r$ as electronic watermark key information, and means 14 for multiplying the created matrix $S_w$ by a matrix U having the acquired left singular vectors $u_1$ to $u_r$ as columns from the left and multiplying the transposed matrix of a matrix V having the acquired right singular vectors $v_1$ to $v_r$ as columns from the right to create a pixel matrix $G_w$ with n rows and m columns, and outputting it as an electronic-watermark-embedded image of the input image.

These means may be implemented as function means by executing, by a CPU, programs stored in a RAM and/or a ROM in the electronic watermark embedding apparatus 1 and/or an external storage medium, for example.

With reference to the flowchart in FIG. 2, operations by the electronic watermark embedding apparatus 1 will be described below. Notably, the steps (including partial steps with no reference numerals given) can be performed in any order or in parallel unless the processing details contradict each other. The electronic watermark embedding apparatus 1 acquires in advance a pixel matrix G with n rows and m columns ($2 \leq n$ and m) of an input image I to be processed from an external apparatus (including a server, a memory device, an imaging device and a scanner device) and stores it in the input image storage means 10.

The singular value decomposition means 11 reads a pixel matrix G of an input image I from the input image storage means 10 (S100). FIG. 3(A) shows an example of the pixel matrix G when n=m=4.

Next, the singular value decomposition means 11 acquires the singular values $s_1$ to $s_r$ ($s_1 > s_2 > \ldots > s_r$), left singular vectors $u_1$ to $u_r$, and right singular vectors $v_1$ to $v_r$ of the pixel matrix G (That is, performing singular value decomposition on the pixel matrix G), and stores them in a memory such as a RAM (S101). Notably, the singular value $S_k$ corresponds to the left singular vector $u_k$ and right singular vector $v_k$.

The method for acquiring singular values and singular vectors may be any of conventional various sequential calculation algorithms (such as QR algorithm). Those algorithms are well known by those skilled in the art, and the programs for implementing the algorithms are easily available. Therefore, the details will not be described herein.

FIGS. 3(B), 3(C) and 3(D) show the singular value $s_1$ to $s_4$, left singular vectors $u_1$ to $u_4$ and right singular vectors $v_1$ to $v_4$ acquired for the pixel matrix G shown in FIG. 3(A).

Next, the watermark information embedding means 12 creates a watermark information matrix W with r rows and r columns having a non-0 value at least as one nondiagonal element as electronic watermark information, creates a diagonal matrix S having the acquired singular values $s_1$ to $s_r$ as diagonal elements, creates a matrix $S_w$ on the basis of $S_w = S + aW$ ($a \neq 0$) and stores them in a memory such as a RAM (S102). In the expression, a is a parameter for adjusting the electronic watermark strength and may be defined, as a=1, for example, in accordance with the design.

Here, the position or specific value of the nondiagonal element having a non-0 value of the watermark information matrix W may be determined by using a random number, for example. Alternatively, it may be determined such that the watermark information matrix W itself can be a meaningful image. On the other hand, each of the diagonal elements of the watermark information matrix W has a tradeoff in which as the value increases, the degree of image deformation increases due to the embedded watermark information while, as the value decreases, the watermark information may easily disappear due to some processing on the image. Accordingly, when the singular values of an image exist in the range from 0.1 to several tens of thousands, it is preferable that the diagonal element value of the watermark information matrix W is approximately 200.

Furthermore, the watermark information matrix W may be created such that the rank of the matrix $S_w$ can be lower than r. For example, the acquired singular values $s_1$ to $s_r$ may be used as the nondiagonal element value of the watermark information matrix W to cause the two or more rows or columns of the matrix $S_w$ to be linearly dependent.

FIG. 4(A) shows an example of the watermark information matrix W created by using S shown in FIG. 3(B) such that the rank of the matrix $S_w$ can be lower than r. FIG. 4(B) shows the matrix $S_w$ created by using S shown in FIG. 3(B) and W shown in FIG. 4(A) and in the case where a=1.

Next, the electronic-watermark-embedded image output means 14 multiplies the created matrix $S_w$ by the matrix U having the acquired left singular vectors $u_1$ to $u_r$ as columns from the left and the transposed matrix of the matrix V having the acquired right singular vectors $v_1$ to $v_r$ as columns from the right to create a pixel matrix $G_w$ with n rows and m columns thereby and stores it in a memory such as a RAM (S103).

Notably, the computing for creating the pixel matrix $G_w$ by step S103 may be expressed by:

$$G_w = US_w V^T$$

FIG. 4(C) shows the pixel matrix $G_w$ created when step S103 by using the left singular vectors $u_1$ to $u_4$, and right singular vectors $v_1$ to $v_4$ shown in FIGS. 3(C) and 3(D) is performed on the $S_w$ shown in FIG. 4(B).

Next, the key information output means 13 outputs the acquired singular values $s_1$ to $s_r$, left singular vectors $u_1$ to $u_r$, and right singular vectors $v_1$ to $v_r$ as electronic watermark key information (S104).

Next, the electronic-watermark-embedded image output means 14 outputs the created pixel matrix $G_w$ as electronic-watermark embedded image 4 of the input image I (S105).

The outputting in step S104 or S105 may include recording in a RAM of the electronic watermark embedding apparatus 1 or an external memory, for example, and transmitting to other devices.

In this way, in the electronic watermark embedding apparatus 1 of this embodiment, singular value decomposition is performed on the pixel matrix G of the input image I to acquire singular values and singular vectors, and electronic watermark information W is embedded to the diagonal matrix S having the acquired singular values as diagonal elements to create the matrix $S_w$. Then, the created matrix $S_w$ is multiplied by the acquired singular vectors from both sides to create the electronic-watermark-embedded image $I_w$ of the input image I.

With the configuration of this embodiment, both of the number of times of singular value decomposition to be performed on the pixel matrix G of the input image I and the number of times of computing based on singular vectors to be performed for acquiring the electronic-watermark-embedded image $I_w$ are one and are matched. Therefore, there are no mathematically unclear points, unlike conventional schemes.

The singular vectors to be used for embedding are singular vectors of the input image and do not include information on the electronic watermark. This can prevent the problem that unintended information of the electronic watermark may mix into the electronic-watermark-embedded image due to the computing based on singular vectors.

Second Embodiment

FIG. 5 is a block diagram showing the configuration of an electronic watermark detecting apparatus according to a second embodiment of the present invention.

As shown in FIG. 5(A), an electronic watermark detecting apparatus 2 includes hardware equivalent to hardware of a normal computer apparatus, such as a CPU, a ROM, a RAM, an HDD, a user interface and a communication interface. The electronic watermark detecting apparatus 2 may physically be either specialized system or generic information processing apparatus. For example, in an information processing apparatus having a general configuration, the electronic watermark detecting apparatus 2 may be implemented by starting software defining processing in an electronic watermark detecting method according to the present invention.

As shown in FIG. 5(B), the electronic watermark detecting apparatus 2 functionally includes examination target image storage mean 20 for storing a pixel matrix $G_k$ with n rows and m columns of an examination target image $I_k$, key information storage means 21 for storing singular values $s_1$ to $s_r$, left singular vectors $u_1$ to $u_r$ and right singular vectors $v_1$ to $v_r$ of a pixel matrix G with n rows and m columns of an input image I as electronic watermark key information, singular vector applying means 22 for multiplying the pixel matrix $G_k$ read from the examination target image storage means 20 by the transposed matrix of a matrix U having the left singular vectors $u_1$ to $u_r$ as columns from the left and a matrix V having the right singular vectors $v_1$ to $v_r$ as columns from the right to create matrix $S_k$ with r rows and r columns, and electronic watermark detecting means 23 for creating a diagonal matrix S* having the singular values $s_1$ to $s_r$ as diagonal elements, creating matrix W* with r rows and r columns on the basis of W*=(S$_k$−S*)/a, and outputting the created matrix W* as the detected electronic watermark.

These means may be implemented as function means by executing, by a CPU, programs stored in a RAM and/or a ROM in the electronic watermark detecting apparatus 2 and/or an external storage medium, for example.

With reference to the flowchart in FIG. 6, operations by the electronic watermark detecting apparatus 2 will be described below. Notably, the steps (including partial steps with no reference numerals given) can be performed in any order or in parallel unless the processing details contradict each other.

The singular vector applying means 22 reads pixel matrix G$_k$ of examination target image I$_k$ from examination target image storage means 20 (S200). The examination target image storage means 20 prestores the pixel matrix G$_k$ with n rows and m columns ($2 \leq$ n and m) of the examination target image I$_k$.

Next, the singular vector applying means 22 reads the singular values s$_1$ to s$_r$, left singular vectors u$_1$ to u$_r$ and right singular vectors v$_1$ to v$_r$ of the pixel matrix G with n rows and m columns of the input image I from the key information storage means 21 as electronic watermark key information (S201).

Here, it is assumed that, in advance, the electronic watermark detecting apparatus 2 acquires the singular values s$_1$ to s$_r$, left singular vectors u$_1$ to u$_r$ and right singular vectors v$_1$ to v$_r$ of the pixel matrix G output by the key information output means 13 in the electronic watermark embedding apparatus 1 and stores them in the key information storage means 21. The acquisition of the data may include acquiring them from the electronic watermark embedding apparatus 1 through communication over a network and reading in the electronic watermark detecting apparatus 2 the data from a portable memory storing them in the electronic watermark embedding apparatus 1.

Alternatively, in the electronic watermark detecting apparatus 2, the pixel matrix G of the input image I may be directly stored, and singular value decomposition is performed on the pixel matrix G to acquire the singular values s$_1$ to s$_r$, left singular vectors u$_1$ to u$_r$ and right singular vectors v$_1$ to v$_r$, which may be stored in the key information storage means 21 then.

Next, the singular vector applying means 22 multiplies the read pixel matrix G$_k$ by the transposed matrix of the matrix U having the left singular vectors u$_1$ to u$_r$ as columns from the left and the matrix V having the right singular vectors v$_1$ to v$_r$ as columns from the right to create the matrix S$_k$ with r rows and r columns, which are then stored in a memory such as a RAM (S202).

Notably, the computing for creating the matrix S$_k$ in step S202 can be expressed as:

$$S_k = U^T G_k V$$

Next, the electronic watermark detecting means 23 creates a diagonal matrix S* having the singular values s$_1$ to s$_r$ as diagonal elements, creates a matrix W* with r rows and r columns on the basis of W*=(S$_k$−S*)/a and outputs the matrix W* as the detected electronic watermark (S203).

The outputting may include recording in a RAM in the electronic watermark detecting apparatus 2 or an external memory, for example, displaying it to a user through a user interface and transmitting it to other apparatus.

In this way, in the electronic watermark detecting apparatus 2 of this embodiment, the computing based on the singular vectors of the pixel matrix G of the input image is performed on the pixel matrix G$_k$ of the examination target image I$_k$ to create the matrix S$_k$, and, on the basis of the created matrix S$_k$ and the diagonal matrix S having the singular values of the pixel matrix G as diagonal elements, the electronic watermark W* is detected.

With the configuration of this embodiment, the singular vectors to be used in order to detect an electronic watermark are the singular vectors of the input image, which do not include the information on the electronic watermark. Therefore, this can prevent the problem that unintended information of an electronic watermark may mix into the detected electronic watermark due to the computing based on singular vectors.

Furthermore, as described on the first embodiment, when the watermark information matrix W is created such that the rank of the matrix S$_w$ can be lower than r and the pixel matrix G$_w$ is created, the following effects can be acquired in the electronic watermark detecting apparatus of the second embodiment.

In the electronic watermark detecting apparatus, when the rank of the pixel matrix G$_k$ is r, appropriate r×r regular matrices T$_U$ and T$_V$ ($=T_U^{-1}$) as illustrated in FIGS. 8(A) and 8(B) may be selected. Thus, a false W, which is different from the embedded one, can be calculated, and the false W may be claimed as the watermark embedded by a user by the following method including the steps of:

1) performing SVD expansion to acquire $S_k = u_k^T G_k v_k$;

2) using regular matrices T$_U$ and T$_V$ to acquire U*=$(T_U U_k^T)^{-1}$, V*$^T$=$(v_k T_V)^{-1}$, S$_k$*=$T_U S_k T_V$ where $G_k = U^* S_k^* V^{*T}$ is satisfied;

3) decomposing the S$_k$* to a diagonal matrix S$_k$ and a nondiagonal matrix W' where, when the T$_U$ and T$_V$ shown in FIGS. 8(A) and 8(B) are used, the S$_k$* may be decomposed to a diagonal matrix S$_k$ and a nondiagonal matrix W' as shown in FIG. 8(C), for example; and 4) claiming the W' acquired by the decomposition as the watermark information embedded by the user and claiming that the diagonal matrix S$_k$ is the singular value matrix of the original image and the columns of the U* and V* are singular vectors of the original image.

On the other hand, when the watermark information matrix W is created such that the rank of the matrix S$_w$ can be lower than r and the pixel matrix G$_w$ is created, the rank of the pixel matrix G$_w$ is lower than r (the pixel matrix G$_w$ lacks information, compared with the pixel matrix G). In other words, the processing for creating the pixel matrix G$_w$ is one-way processing.

Therefore, when the false W is acquired by the method for the pixel matrix G$_{w (or Gk)}$, the rank of the S$_k$ acquired by 1) is lower than r, the numbers of linear dependent columns of the U$_k$ and V$_k$ are lower than r. In this case, even with the use of any regular matrices T$_U$ and T$_V$, the numbers of linear dependent columns of the U* and V* acquired by 2) are lower than r. Therefore, when the rank r of the original image I is publicly known, the claim based on the method can be rejected by comparing the publicly known rank r, the rank of the S$_k$ claimed on the basis of the method and the numbers of linear dependent columns of the U* and V*.

Variation Example

The present invention is applicable by being changed in various manners, without limiting to the embodiments.

For example, in the first embodiment, a partial image cut out from an original image I$_o$ in which an electronic watermark is to be embedded may be the input image I.

More specifically, as shown in FIG. 7, the original image storage means 15 for storing an original image I$_o$ in which an electronic watermark is to be embedded, cut out means 16 for cutting out a partial image of n×m pixels from an original image $I_o$, storing the pixel matrix of the partial image as a pixel matrix G with n rows and m columns of an input image I in the input image storage means 10, and electronic-watermark-embedded original image output means 17 for replacing the partial image in the original image $I_o$ by the electronic-watermark-embedded image $I_w$ of the input image I output by the electronic-watermark-embedded image output means 15 to create and output an electronic-watermark-embedded image of the original image $I_o$ may further be provided. In this case, the cut out means 16 and electronic-watermark-embedded original image output means 17 may be configured in the same manner as a cutout function module and synthesis function (insertion function) module included in a normal image editing apparatus.

With the configuration, an electronic watermark based on the present invention can be embedded at an arbitrary position on an original image I.

Furthermore, for example, having described according to the second embodiment that the matrix W* is output as the detected electronic watermark, in addition to or instead of that, the presence of an electronic watermark may be determined and the determination result may be output.

More specifically, the electronic watermark detecting apparatus 2 may acquire the watermark information matrix W embedded when the electronic-watermark-embedded image $I_w$, is created, like the electronic watermark key information from the electronic watermark embedding apparatus 1 and store it in a RAM, for example. Then, the correlation value between the watermark information matrix W and the matrix W* may be calculated. If the correlation value is equal to or higher than a predetermined value, it is determined that the examination target image $I_k$ contains an electronic watermark.

Notably, the present invention is also applicable to data (such as audio data) excluding image data. In order to apply it to data excluding image data, the data may be transformed to two-dimensional array data with n rows and m columns under a predetermined rule (for example, if the data is one-dimensional data, a certain series of n data is handled as the first row, the next series of n data as the second row and so on to form a two-dimensional array with n rows and m columns). Then, the two-dimensional array data may be regarded as the pixel matrix G with n rows and m columns of the input image I. In other words, the "image" in the present invention is the concept including not only general image data of a still picture or a frame image within a moving picture but also image data obtained as a result of the transformation of voice data and so on to a two-dimensional array.

BRIEF DESCRIPTION OF DRAWINGS

FIG. 1 is a block diagram showing the hardware configuration and function configuration of an electronic watermark embedding apparatus 1 according to a first embodiment.

FIG. 3 is a diagram illustrating the process for embedding an electronic watermark with reference to an example.

FIG. 4 is a diagram illustrating the process for embedding an electronic watermark with reference to an example.

FIG. 5 is a block diagram showing the hardware configuration and function configuration of an electronic watermark detecting apparatus 2 of a second embodiment.

FIG. 8 is a diagram showing examples of regular matrices $T_U$ and $T_V$.

REFERENCE NUMERALS

Figure 2:
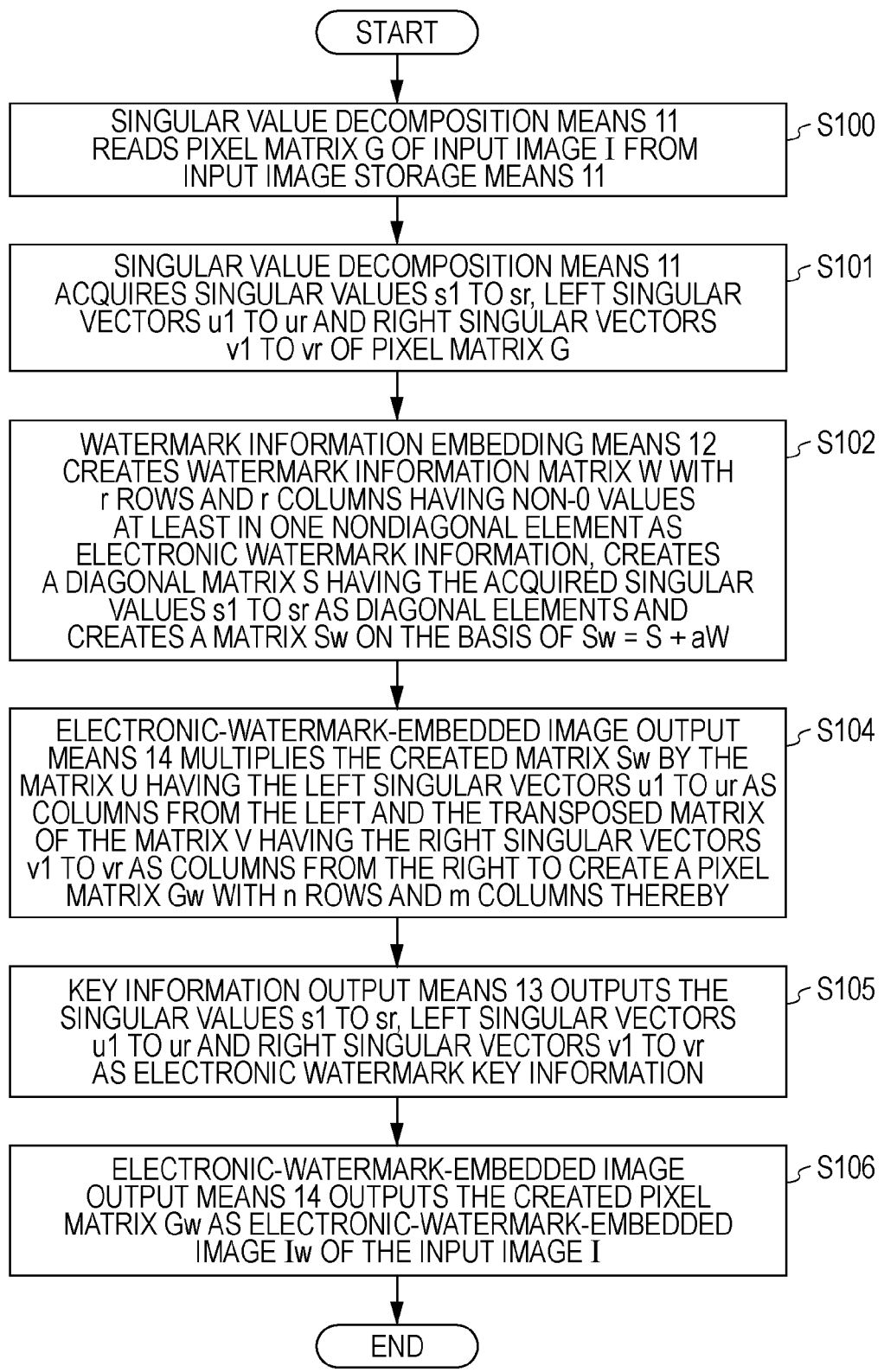
FIG. 2 is a flowchart for describing operations by the electronic watermark embedding apparatus 1.
Figure 6:
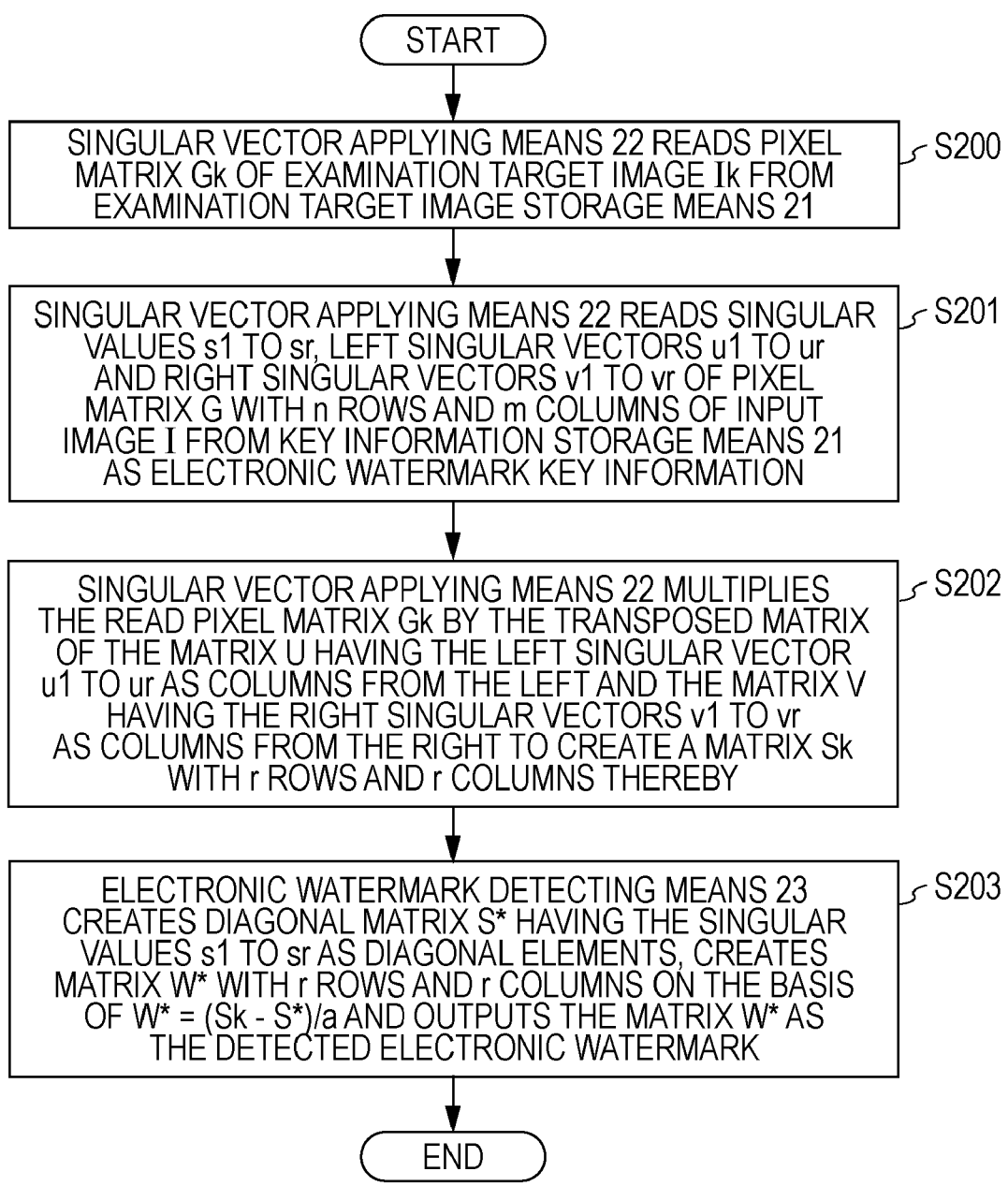
FIG. 6 is a flowchart for describing operations by the electronic watermark detecting apparatus 2 of the second embodiment.
Figure 7:
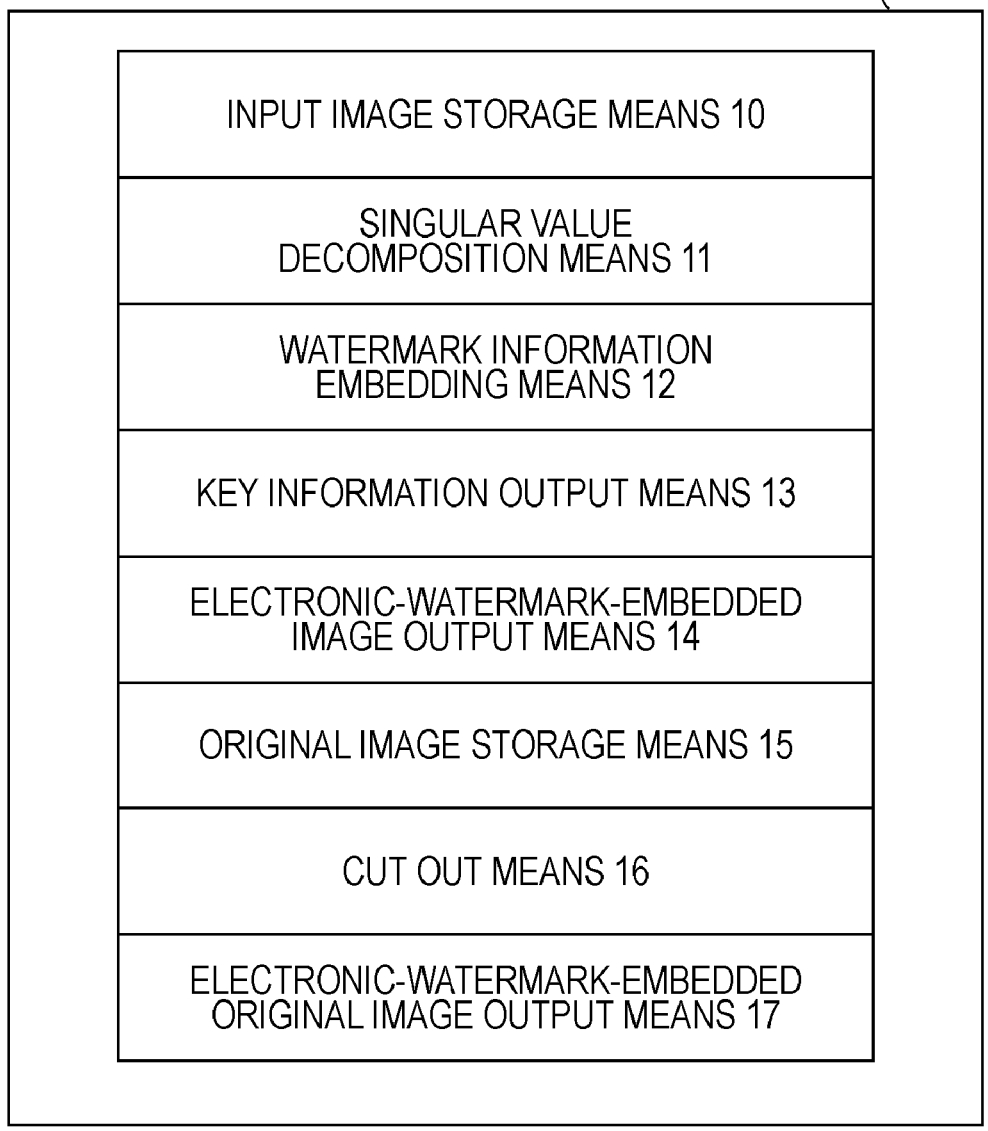
FIG. 7 is a block diagram showing the function configuration of the electronic watermark embedding apparatus 1 of a variation example.

1 electronic watermark embedding apparatus
2 electronic watermark detecting apparatus
10 input image storage means
11 singular value decomposition means
12 watermark information embedding means
13 key information output means
14 electronic-watermark-embedded image output means
15 original image storage means
16 cut out means
17 electronic-watermark-embedded original image output means
20 examination target image storage means
21 key information storage means
22 singular vector applying means
23 electronic watermark embedding apparatus

The invention claimed is:

1. An electronic watermark embedding apparatus comprising:
   input image storage means for storing a pixel matrix G with n rows and m columns ($2 \leq$ n and m) of an input image;
   singular value decomposition means for acquiring singular values $s_1$ to $s_r$ ($s_1 > s_2 > \ldots > s_r$), left singular vectors $u_1$ to $u_r$, and right singular vectors $v_1$ to $v_r$ of the pixel matrix G read from the input image storage means;
   watermark information embedding means for creating a watermark information matrix W with r rows and r columns having a non-0 value as at least one nondiagonal element as electronic watermark information, creating a diagonal matrix S having singular values $s_1$ to $s_r$ as diagonal elements, and creating a matrix $S_w$ on the basis of $S_w = S + aW$ ($a \neq 0$);
   means for outputting the acquired singular values $s_1$ to $s_r$, left singular vectors $u_1$ to $u_r$ and right singular vectors $v_1$ to $v_r$ as electronic watermark key information; and
   means for multiplying the created matrix $S_w$ by a matrix U having the acquired left singular vectors $u_1$ to $u_r$ as columns from the left and multiplying the transposed matrix of a matrix V having the acquired right singular vectors $v_1$ to $v_r$ as columns from the right to create a pixel matrix $G_w$ with n rows and m columns, and outputting it as an electronic-watermark-embedded image of the input image.

2. The electronic watermark embedding apparatus according to claim 1, further comprising:
   original image storage means for storing an original image which is to be the target for embedding an electronic watermark;
   means for cutting out a partial image of n×m pixels from the original image means and storing a pixel matrix of the partial image in the input image storage means as the pixel matrix G with n rows and m columns of the input image; and
   means for replacing the partial image in the original image by the electronic-watermark-embedded image of the input image to create an electronic-watermark-embedded image of the original image and outputting it.

3. The electronic watermark apparatus according to claim 1 wherein the watermark information embedding means creates the watermark information matrix W such that the rank of the matrix $S_w$ can be lower than r.

4. An electronic watermark detecting apparatus comprising:
examination target image storage mean for storing a pixel matrix $G_k$ with n rows and m columns of an examination target image;
key information storage means for storing singular values $s_1$ to $s_r$, left singular vectors $u_1$ to $u_r$, and right singular vectors $v_1$ to $v_r$ of a pixel matrix G with n rows and m columns of an input image as electronic watermark key information;
means for multiplying the pixel matrix $G_k$ read from the examination target image storage means by the transposed matrix of a matrix U having the left singular vectors $u_1$ to $u_r$ as columns from the left and a matrix V having the right singular vectors $v_1$ to $v_r$ as columns from the right to create a matrix $S_k$ with r rows and r columns; and
means for creating a diagonal matrix S* having the singular values $s_1$ to $s_r$ as diagonal elements, creating matrix W* with r rows and r columns on the basis of $W^* = (S_k - S^*)/a$, and outputting it as the detected electronic watermark.

5. An electronic watermark embedding method comprising:
the step of reading a pixel matrix G with n rows and m columns ($2 \leq n$ and m) of an input image from input image storage means storing the pixel matrix G;
a singular value decomposition step of acquiring the singular values $s_1$ to $s_r$ ($s_1 > s_2 > \ldots > s_r$), left singular vectors $u_1$ to $u_r$, and right singular vectors $v_1$ to $v_r$ of the read pixel matrix G;
the step of creating a watermark information matrix W with r rows and r columns having a non-0 value as at least one nondiagonal element as electronic watermark information;
the watermark information embedding step of creating a diagonal matrix S having singular values $s_1$ to $s_r$ as diagonal elements and creating a matrix $S_w$ on the basis of $S_w = S + aW$ ($a \neq 0$);
the step of outputting the acquired singular values $s_1$ to $s_r$, left singular vectors $u_1$ to $u_r$, and right singular vectors $v_1$ to $v_r$ as electronic watermark key information;
the step of multiplying the created matrix $S_w$ by a matrix U having the acquired left singular vectors $u_1$ to $u_r$ as columns from the left and the transposed matrix of a matrix V having the acquired right singular vectors $v_1$ to $v_r$ as columns from the right to create a pixel matrix $G_w$ with n rows and m columns and outputting it as an electronic-watermark-embedded image of the input image.

6. An electronic watermark detecting method comprising the steps of
reading a pixel matrix $G_k$ with n rows and m columns of an examination target image from examination target image storage means for storing the pixel matrix $G_k$;
reading singular values $s_1$ to $s_r$, left singular vectors $u_1$ to $u_r$, and right singular vectors $v_1$ to $v_r$ from key information storage means storing singular values $s_1$ to $s_r$, left singular vectors $u_1$ to $u_r$, and right singular vectors $v_1$ to $v_r$ of pixel matrix $G_k$ with n rows and m columns of the input image as electronic watermark key information;
multiplying the read pixel matrix $G_k$ by the transposed matrix of the matrix U having the read left singular vectors $u_1$ to $u_r$ as columns from the left and the matrix V having the read right singular vectors $v_1$ to $v_r$ as columns from the right to create a matrix $S_k$ with r rows and r columns; and
creating a diagonal matrix S* having the read singular values $s_1$ to $s_r$ as diagonal elements, creating a matrix W* with r rows and r columns on the basis of $W^* = (S_k - S^*)/a$ and outputting them as the detected electronic watermark.

7. A program embodied on a non-transitory computer readable medium causing a computer to execute the electronic watermark embedding method according to claim 5.

8. A program embodied on a non-transitory computer readable medium causing a computer to execute the electronic watermark embedding method according to claim 6.

* * * * *

UNITED STATES PATENT AND TRADEMARK OFFICE
CERTIFICATE OF CORRECTION

PATENT NO.       : 7,787,654 B2
APPLICATION NO.  : 12/665308
DATED            : August 31, 2010
INVENTOR(S)      : Ohzeki It is certified that error appears in the above-identified patent and that said Letters Patent is hereby corrected as shown below:

In Fig. 2, Sheet 2 of 8, delete Tag "S104" and insert Tag -- S103 --, therefor.

In Fig. 2, Sheet 2 of 8, delete Tag "S105" and insert Tag -- S104 --, therefor.

In Fig. 2, Sheet 2 of 8, delete Tag "S106" and insert Tag -- S105 --, therefor.

In Column 1, Line 54, delete "121-128" and insert -- 121-128. --, therefor.

In Column 1, Line 58, delete "593-594" and insert -- 593-594. --, therefor.

In Column 4, Line 58, delete "Ito" and insert -- I to --, therefor.

In Column 6, Line 7, delete "4" and insert -- $I_w$ --, therefor.

In Column 6, Line 14, delete "Ito" and insert -- I to --, therefor.

In Column 8, Line 48, delete "$_{(or\ Gk)}$)," and insert -- (or $G_k$), --, therefor.

In Column 9, Line 19, delete "I." and insert -- $I_o$. --, therefor.

In Column 9, Line 29, delete "$I_w$," and insert -- $I_w$ --, therefor.

In Column 11, Line 1, in Claim 3, delete "watermark apparatus" and insert -- watermark embedding apparatus --, therefor.

In Column 12, Line 12, in Claim 6, delete "of" and insert -- of: --, therefor.

Signed and Sealed this
Twenty-eighth Day of August, 2012

David J. Kappos
*Director of the United States Patent and Trademark Office*